United States Patent
Szewalski

[15] 3,683,621
[45] Aug. 15, 1972

[54] METHOD OF IMPROVING THE POWER CYCLE EFFICIENCY OF A STEAM TURBINE FOR SUPERCRITICAL STEAM CONDITIONS

[72] Inventor: Robert Szewalski, Batorego Str. 19, Gdansk, Poland

[22] Filed: March 16, 1971

[21] Appl. No.: 124,756

[30] Foreign Application Priority Data

March 17, 1960 Poland..........................139446

[52] U.S. Cl..........................................60/73, 60/104
[51] Int. Cl.................................................F01k 7/32
[58] Field of Search..................60/36, 69, 70, 73, 104

[56] References Cited

UNITED STATES PATENTS 2,804,851   9/1957   Smoot..........................60/73
2,959,014   11/1960   Artsay..........................60/73

*Primary Examiner*—Martin P. Schwadron
*Assistant Examiner*—Allen M. Ostrager
*Attorney*—Waters, Roditi, Schwartz & Nissen

[57] ABSTRACT

A method of increasing the efficiency of a power cycle of a steam turbine at supercritical steam conditions comprises the steps of, first expanding the working medium at supercritical steam conditions to a pressure higher than the critical pressure and then dividing the working medium into first and second streams. The first stream is expanded in the turbine, with interstage reheating, and multi-stage regenerative feed water heating is effected by condensing extraction steam and cooling the second stream by heat exchange with the feed water preliminary heated by the regeneration extractions whereupon the second stream is mixed with the feed water and returned to the first expanding step to complete the cycle.

8 Claims, 2 Drawing Figures

METHOD OF IMPROVING THE POWER CYCLE EFFICIENCY OF A STEAM TURBINE FOR SUPERCRITICAL STEAM CONDITIONS

BRIEF SUMMARY OF THE INVENTION

This invention relates to a method of improving the efficiency of a steam turbine power cycle for supercritical steam conditions.

The conventional power cycles of steam turbines are based on the fundamental Rankine cycle consisting of two isobars $P_1$, $P_2$, along which heat is added and extracted, and two adiabates, determining the positive work of expansion and the negative work of compression (pumping).

In seeking higher cycle efficiencies, development work has been carried out towards: increasing the initial steam conditions $p_1$, $t_1$ and decreasing the exhaust pressure $p_2$;

Application of the regeneration principle by means of bleeding steam in the course of expansion in the turbine; — application of single or even double interstage reheating in the course of expansion.

In spite of all the mentioned measures employed simultaneously, even in the most modern power plants and even disregarding the unavoidable losses occuring in practice during the individual processes of the cycle as a consequence of the limited efficiency of the turbine itself and the feed pump, the drop of steam pressure in the reheater and the regeneration system, definite temperature differences between the heat exchanging media in heat exchangers, the cycle efficiency of conventional power plants differs considerably from the efficiency of the ideal Carnot cycle as expressed as a function of the limiting temperatures of the cycle in accordance with the relation $$c = 1 - T_2/T_1$$

Other concepts are also known, aimed at improving the efficiency of steam cycles by combining them with other high-temperature cycles, such as the binary mercury water cycle, the gas steam cycle and the combined cycle with a magnetohydrodynamic generator in the high-temperature part of the cycle and a conventional steam turbine in the low-temperature part of the cycle.

The application of these unconventional cycles is rather expensive, not sufficiently reliable and even dangerous for the servicing staff. Moreover, they present substantial difficulties in practice, and cannot be commonly applied at the present state of engineering knowledge, except in experimental devices.

An object of the present invention is to provide a method of utilizing the energy in the steam cycle in which a substantial gain in cycle efficiency is obtained economically, by technologically available means, and without danger in servicing.

According to the invention this is achieved by providing a cycle with supercritical steam conditions, with full application of the resuperheating regeneration principle. A regenerative feed water heating beyond saturation temperature corresponding to steam pressure at the first bleed from the turbine is accomplished by exchanging heat between two streams of the working fluid, e.g. steam, at appropriately selected, supercritical pressures.

In the first stage of expansion, the working fluid is expanded to a lower pressure which is however always higher than critical. Than the working fluid is divided into two streams. One of them is expanded in the turbine in conventional manner, with application of interstage reheating, if necessary, and multistage regenerative feed water heating by means of condensing extraction steam. The other stream is cooled in an exchanger and yields heat to feed water already preliminary heated in regenerative feed heaters.

According to the invention, the power cycle can also be applied at the high-temperature part in a binary cycle with steam as the high-temperature fluid and a refrigerant as the low-temperature one.

DETAILED DESCRIPTION

Figure 1:
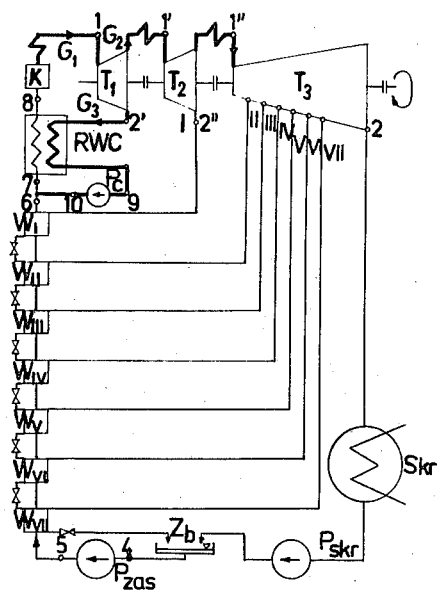
FIG. 1 is a diagrammatic representation of an embodiment of a turbine power apparatus according to the invention.
Figure 2:
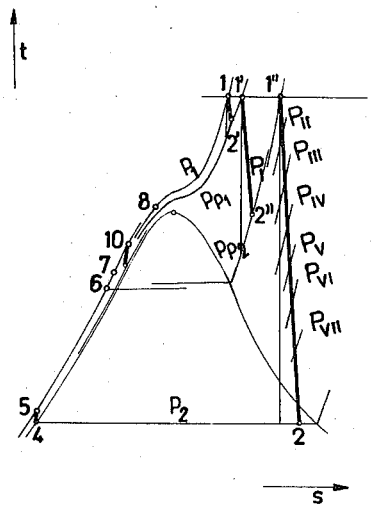
FIG. 2 is a graphic illustration of the entropy diagram of this cycle.

As shown in FIG. 1, a stream $G_1$ of steam at supercritical state expands in turbine $T_1$ from conditions 1 to 2', (FIG. 2). From here the stream is divided into two parts. One stream $G_2$ flows to an interstage reheater where the temperature is increased from state 2' to state 1', corresponding approximately to the initial temperature at point 1. Next, the stream $G_2$ is expanded in turbine $T_2$ from state 1' to state 2'', and after a second interstage reheating from 2'' to 1'' is again expanded in turbine $T_3$ from state 1'' to 2, reaching finally the condenser pressure $p_2$.

In course of the expansion of stream $G_2$, steam is bled for regenerative feed-water heating. There are seven bleeds in the illustrated embodiment, numbered I to VII, with corresponding pressures $P_I$ through $P_{VII}$, respectively.

The exhaust steam from the turbine is directed in succession via condenser Skr, to condenser pump $P_{skr}$ and hot sink Zb, and then to feed pump $P_{zas}$ where the condensate pressure is raised from state 4 to state 5.

Further on, the condensate flows through the system of regenerative heat exchangers $W_{VII}$ to $W_I$ where it is heated to the temperature corresponding to state 6. The stream $G_2$ of the working fluid at state 6 (after expansion in turbines $T_2$ and $T_3$) is mixed with the stream $G_3$ after stream $G_3$ has passed through the regenerative heat exchanger RWC where it serves as the heating medium. The resulting stream of flow intensity $G_1 = G_2 + G_3$ is heated in the regenerative heat exchanger RWC from state 7 to state 8, at the expense of cooling the stream $G_3$ from state 2' to state 9.

In order to bring the streams $G_2$ and $G_3$ together, the pressure of stream $G_3$ is raised by pump $P_c$ from state 9 to state 10, thus equalizing the pressures.

The temperature differences between the media at the inlet and outlet of the heat exchanger RWC, i.e. the difference $t_8 - t_7$ between states 8 and 7, and $t_2' - t_9$ between states 2' and 9 are always positive, and are determined by technical and economic considerations.

The stream $G_1$ now composed of streams $G_2$ and $G_3$ is heated in boiler K to the supercritical conditions and supplied to turbine $T_1$ to complete the cycle.

What is claimed is:

1. A method of increasing the efficiency of the power cycle of a steam turbine at supercritical steam conditions, said method comprising expanding a working medium at supercritical steam conditions to a pressure which remains higher than the critical pressure, dividing the expanded working medium into first and second streams, expanding the first steam in a turbine and recycling the exhausted medium from the turbine back towards the first expanding step, and combining the second stream with the exhausted medium to form the working medium supplied to the first expanding step.

2. A method as claimed in claim 1 wherein said second stream is combined with the exhausted medium after effecting heat exchange therewith.

3. A method as claimed in claim 2 wherein the expansion in the turbine is effected in stages and comprising the step of effecting interstage reheating of the working medium between stages.

4. A method as claimed in claim 3 comprising bleeding steam from the turbine in multiple stages and effecting regenerative heating of the exhausted medium from the turbine before said medium is combined with said second stream.

5. A method as claimed in claim 1 wherein said exhausted medium and said second stream undergo heat exchange in a heat exchanger, said second stream being combined with said exhausted medium after passage of the second stream through said heat exchanger, the mixture of exhausted medium and second stream then flowing through the heat exchanger.

6. A method as claimed in claim 1 comprising expanding the first stream in two stages in two turbines with interstage reheating between the turbines.

7. A method as claimed in claim 1 wherein the exhausted medium from the turbine is steam and comprising the step of condensing the steam to form a feed water flow for return to the first expanding step.

8. A method as claimed in claim 1 comprising adjusting the pressure of said second stream prior to combining with said exhausted medium so that the pressures of said second stream and exhausted medium are approximately equal.

* * * * *

UNITED STATES PATENT OFFICE
CERTIFICATE OF CORRECTION

Patent No. 3,683,621　　　　　　　Dated August 15, 1972

Inventor(s) Robert Szewalski,

It is certified that error appears in the above-identified patent and that said Letters Patent are hereby corrected as shown below:

On the cover sheet, [30] "March 17, 1960" should read -- March 17, 1970 -- .

Signed and sealed this 19th day of December 1972.

(SEAL)
Attest:

EDWARD M. FLETCHER, JR.　　　　　ROBERT GOTTSCHALK
Attesting Officer　　　　　　　　Commissioner of Patents